(12) United States Patent
Yoshida

(10) Patent No.: US 8,465,878 B2
(45) Date of Patent: Jun. 18, 2013

(54) FUEL CELL SYSTEM, CONTROL METHOD THEREFOR, AND MOVABLE OBJECT

(75) Inventor: Michio Yoshida, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1161 days.

(21) Appl. No.: 12/280,062

(22) PCT Filed: Nov. 8, 2007

(86) PCT No.: PCT/JP2007/072137
§ 371 (c)(1),
(2), (4) Date: Aug. 20, 2008

(87) PCT Pub. No.: WO2008/059902
PCT Pub. Date: May 22, 2008

(65) Prior Publication Data
US 2010/0227237 A1   Sep. 9, 2010

(30) Foreign Application Priority Data
Nov. 13, 2006   (JP) .................................. 2006-306544

(51) Int. Cl.
*H01M 8/04*   (2006.01)
(52) U.S. Cl.
USPC ............................ 429/432; 429/428; 429/430
(58) Field of Classification Search
USPC .................. 429/428, 429, 430, 432, 443, 444
See application file for complete search history.

(56) References Cited

U.S. PATENT DOCUMENTS

| | | | |
|---|---|---|---|
| 2003/0134167 A1* | 7/2003 | Hirakata | 429/22 |
| 2004/0101724 A1* | 5/2004 | Imamura et al. | 429/22 |
| 2007/0141413 A1* | 6/2007 | Nielsen et al. | 429/22 |
| 2007/0166582 A1* | 7/2007 | Okamoto | 429/22 |

FOREIGN PATENT DOCUMENTS

| | | |
|---|---|---|
| JP | 2003-115318 A | 4/2003 |
| JP | 2004-172028 A | 6/2004 |
| JP | 2005-346979 A | 12/2005 |
| JP | 2006-128016 A | 5/2006 |
| JP | 2006-185750 A | 7/2006 |
| JP | 2006-236739 A | 9/2006 |

* cited by examiner

*Primary Examiner* — Matthew Landau
*Assistant Examiner* — Colleen E Snow
(74) *Attorney, Agent, or Firm* — Kenyon & Kenyon LLP

(57) ABSTRACT

The oxidizing gas supply is stopped during the catalyst activation treatment, and the output voltage of the fuel cell is linearly decreased toward the reduction target voltage. Once the interruption condition of the activation treatment has been satisfied, a voltage command value of the converter is returned to a standby voltage and, after waiting till the output voltage of the fuel cell returns to the vicinity of the standby voltage, the compressor is operated to start the supply of the oxidizing gas, and the catalyst activation treatment is completed. As a result, overcharging of the battery caused by rapid increase in the output power of the fuel cell is avoided.

10 Claims, 5 Drawing Sheets

FUEL CELL SYSTEM, CONTROL METHOD THEREFOR, AND MOVABLE OBJECT

This is a 371 national phase application of PCT/JP2007/072137 filed 8 Nov. 2007, which claims priority to Japanese Patent Application No. 2006-306544 filed 13 Nov. 2006, the contents of which are incorporated herein by reference.

BACKGROUND

The present invention relates to a fuel cell system, and more particularly to a technology for controlling a fuel cell system that can reliably interrupt the treatment of activating a catalyst layer of a fuel cell, while avoiding the overcharging of a power storage device.

In a fuel cell system, the output voltage of a fuel cell decreases as oxygen is adsorbed by a catalyst layer of the fuel cell during operation of the system. In such cases, a treatment has conventionally been performed by which the supply of oxygen to the fuel cell is temporarily stopped and the output voltage of the fuel cell is decreased to a reduction region of the catalyst layer, thereby activating the catalyst layer of the fuel cell stack (that is, a reduction treatment is performed).

As the initial step of such activation treatment, the supply of an oxidizing gas (for example, air) is stopped and then control is performed to reduce the output voltage of the fuel cell to a target reduction voltage value.

Further, the control is so performed that when it is necessary to terminate the activation process in the course of decreasing the output voltage of the fuel cell to the target reduction voltage value, the supply of the oxidizing gas (for example, air) is immediately restarted. Such a necessity to terminate the activation treatment can occur, for example, when a cross leak occurs in an electrolyte membrane of the fuel cell and the fuel gas (for example, hydrogen) leaks from an anode electrode (electrode to which the fuel gas is supplied) to a cathode electrode (electrode to which the oxidizing gas is supplied). Thus, because the electrolyte of a fuel cell is composed of a porous material to increase the surface area of contact of both electrodes with the oxidizing gas or fuel gas, it is possible that a cross leak will occur. The upper limit of the output voltage of the fuel cell is limited by a voltage conversion unit (for example, a converter) that can set the upper limit of the output voltage of the fuel cell.

According to the technology relating to the catalyst activation treatment of fuel cells disclosed in Japanese Patent Application Laid-open No. 2005-346979, a low-voltage battery is used as a reserve device constituting a hybrid fuel cell, and an extra power that increases following the decrease in voltage during catalyst activation treatment of the fuel cell is charged into the battery, thereby effectively using the extra power.

Japanese Patent Application Laid-open No. 2003-115318 discloses a technology of inducing a reduction reaction in oxygen by reducing the cell voltage to 0.6 V or less and passing a large electric current, thereby activating a platinum catalyst layer, as another technology relating to such catalyst activation treatment.

However, with the above-described conventional technology, when the activation treatment is interrupted in the course of decreasing the output voltage of the fuel cell to the target reduction voltage in order to activate the catalyst layer of the fuel cell, the control is performed, as described above, so as to restart immediately the supply of the oxidizing gas. Therefore, when the supply of the oxidizing gas is restarted, the output voltage of the fuel cell drops below the standby voltage. Where the supply of the oxidizing gas is restarted in a state in which the output voltage of the fuel cell is lower than the standby voltage, the output power of the fuel cell rapidly increases, sometimes causing overcharging of a power storage device such as a secondary battery.

Here, a case in which a cross leak occurs in an electrolyte membrane of a fuel cell and a fuel gas (for example, hydrogen) leaks from an anode (fuel gas) electrode side to a cathode (oxidizing gas) electrode side will be considered as a case in which the activation treatment is interrupted. In such case, a large amount of an oxidizing gas (for example, air) has to be supplied to the cathode electrode in order to decrease the concentration of fuel gas (for example, hydrogen) in the exhaust gas. However, where a large amount of an oxidizing gas (for example, air) is supplied to the cathode electrode in the course of catalyst activation treatment (referred to hereinbelow as "refreshing"), the power generated by the fuel cell rapidly increases and extra power that can be charged into a power storage device is generated. In particular, in the course of refreshing, because a load device is stopped and, therefore, power consumption is low, the power storage device is overcharged.

SUMMARY

Accordingly, it is an object of the present invention to provide a fuel cell system that can reliably interrupt the treatment of activating a catalyst layer of a fuel cell, while avoiding the overcharging of a power storage device, in order to resolve the above-described problems.

In order to resolve the above-described problems, the fuel cell system in accordance with the present invention is a fuel cell system in which a catalyst activation treatment is implemented by reducing an output voltage of a fuel cell, wherein when the catalyst activation treatment is interrupted in the course of implementing the catalyst activation treatment, a treatment is implemented for returning the output voltage of the fuel cell to a standby voltage, and after waiting till an oxidizing gas supply condition is satisfied, an oxidizing gas is supplied to the fuel cell.

Further, a method for controlling a fuel cell system in accordance with the present invention is a method for controlling a fuel cell system in which a catalyst activation treatment is implemented by reducing an output voltage of a fuel cell, the method comprising the steps of: determining whether the catalyst activation treatment is interrupted in the course of implementing the catalyst activation treatment; returning the output voltage of the fuel cell to a standby voltage when the catalyst activation treatment is determined to be interrupted; waiting till an oxidizing gas supply condition is satisfied; and supplying an oxidizing gas to the fuel cell when the oxidizing gas supply condition is satisfied.

With such configuration, when the catalyst activation treatment is interrupted, a treatment is performed for returning the output voltage of the fuel cell to the standby voltage. Therefore, the actual output voltage of the fuel cell starts to rise in a state with a relatively small amount of oxidizing gas. If the oxidizing gas is directly supplied to the fuel cell in such state, a very large power will be generated. By contrast, in accordance with the present invention, the oxidizing gas supply is started after waiting till the oxidizing gas condition is satisfied. Therefore, the generation of the extra power than cannot be consumed is inhibited.

For example, the fuel cell system in accordance with the present invention comprises voltage conversion means for changing the output voltage of the fuel cell in accordance with a voltage command value; voltage detection means for detecting the output voltage of the fuel cell; control means for issuing the voltage command value to the voltage conversion means; interruption condition determination means for determining whether an interruption condition of the catalyst activation treatment has been satisfied; and oxidizing gas supply means for supplying an oxidizing gas to a cathode electrode of the fuel cell, wherein when the interruption condition determination means determines that the interruption condition of the catalyst activation treatment has been satisfied in the course of implementing the catalyst activation treatment, the control means issues the standby voltage as a command value to the voltage conversion means, waits thereafter till the oxidizing gas supply condition is satisfied, and then performs control to supply the oxidizing gas to the cathode electrode side of the fuel cell.

A voltage drop period after the oxidizing gas supply is stopped and before the reduction target voltage is reached, or a voltage retention period after the reduction target voltage has been reached may serve as the timing for interrupting the catalyst activation treatment.

In the fuel cell system the oxidizing gas supply condition is that a predetermined time elapses from a point of time at which a treatment for returning the output voltage of the fuel cell to the standby voltage is implemented.

With such configuration, by waiting for a predetermined interval corresponding to an output voltage rise characteristic of the fuel cell that has been determined in advance, the output voltage of the fuel cell rises significantly and it is possible to perform control such that an excess power is not generated even if the oxidizing gas is supplied. For example, the oxidizing gas supply condition is that the output voltage of the fuel cell reaches a predetermined voltage value.

With such configuration, where the predetermined voltage value is set to a voltage that can be determined, for example, by experiment and that does not let the output voltage of the fuel cell rapidly increase even when the oxidizing gas is supplied, it is possible to determine reliably the timing at which the output voltage of the fuel cell is not caused to increase rapidly even when the oxidizing gas is supplied to the cathode electrode side of the fuel cell.

For example, the interruption condition of the catalyst activation treatment is that a cross leak occurrence is detected in the fuel cell.

Such condition indicates that a cross leak is detected in the fuel cell (for example, on the anode electrode side) and that a necessary large amount of oxidizing gas (for example, air) has to be supplied to decrease the concentration of fuel gas (for example, hydrogen) in the exhaust gas, that is, that the catalyst activation treatment has to be interrupted.

Here, the occurrence of cross leak may be the leak of the fuel gas (for example, hydrogen gas) from the anode electrode side of the electrolyte membrane to the cathode electrode side, or the leak of the oxidizing gas (for example, air) from the cathode electrode side to the anode electrode side, or the leak of the fuel gas to the fuel cell periphery.

For example, the cross leak occurrence is detected by a predetermined pressure decrease of a fuel gas on the anode electrode side of the fuel cell.

The cross leak occurs when the fuel gas leaks from the anode electrode side to the cathode electrode side, and with the above-described configuration, the occurrence of cross leak in the fuel cell can be detected with high reliability.

For example, the amount of the oxidizing gas supplied to the fuel cell is an amount of the oxidizing gas sufficient to be supplied to the all cathode electrodes of the fuel cell.

With such configuration, when cross leak occurs in a fuel cell, a large amount of the oxidizing gas (for example, air) necessary to decrease the concentration of the fuel gas (for example, hydrogen) in the exhaust gas can be supplied to all the cathode electrodes.

The fuel cell in accordance with the present invention may further comprise a power storage device, wherein the catalyst activation treatment may be started on condition that the power storage device is in a state in which it can be charged to a power amount equal to or higher than the predetermined power amount.

With such configuration, the extra power generated by the power generation treatment of the fuel cell can be charged for reuse into a power storage device (for example, a battery, a secondary battery, a capacitor, or the like). Where the catalyst activation treatment is started on condition that the predetermined power can be charged in the power storage device, some extra power generated due to the interruption of the catalyst activation treatment can be completely charged.

The present invention also provides a movable object comprising the above-described fuel cell system. The fuel cell system in accordance with the present invention is applicable to electric automobiles and other movable objects (movable on the ground, on the water, in the water, and in the air) because the operation in accordance with the present invention is suitable for inhibiting overcharging of power storage devices mounted on the movable objects.

DETAILED DESCRIPTION

The preferred embodiments of carrying out the present invention will be described below with reference to the appended drawings.

In the embodiments of the present invention, the present invention is applied to a hybrid fuel cell system mounted on an electric automobile. The below-described embodiments are merely simple illustrations of the application mode of the present invention, and the present invention is not limited thereto.

(Explanation of Principle)

Figure 1:
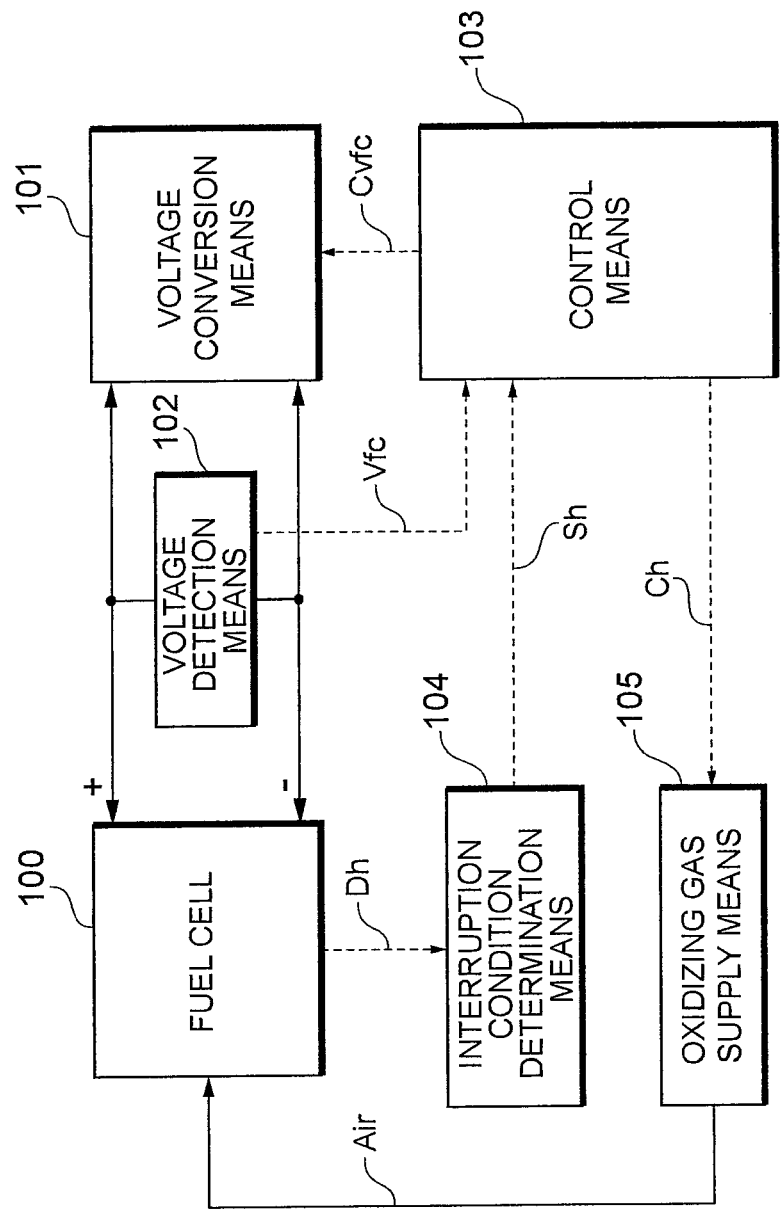
FIG. 1 is a functional block diagram illustrating the principle of the present invention.

FIG. 1 is a functional block diagram illustrating the principle of the present invention.

As shown in FIG. 1, the present invention provides a fuel cell system in which a catalyst activation treatment is implemented by reducing an output voltage Vfc of a fuel cell 100, the fuel cell system comprising a voltage conversion means 101, a voltage detection means 102, a control means 103, an interruption condition determination means 104, and an oxidizing gas supply means 105.

The voltage conversion means 101 is a functional block that changes the output voltage Vfc of the fuel cell 100 in accordance with a voltage command value Cvfc supplied from the control means. The voltage conversion means 101 can be realized by a device that can forcibly maintain a constant output terminal voltage of the fuel cell, for example, by a DC-DC converter.

The voltage detection means 102 is a functional block that detects the output voltage Vfc of the fuel cell. Examples of devices suitable as the voltage detection means 102 include devices that can directly detect the output voltage of the fuel cell, such as a voltage sensor, and devices (computer and the like) that estimate the output voltage of the fuel cell based on other parameters correlated with the output voltage of the fuel cell.

The control means 103 is a functional block that issues a voltage command value Cvfc to the voltage conversion means 101. The control means 103 is realized by a computer executing a software program for executing the control method in accordance with the present invention.

The interruption condition determination means 104 is a functional block that determines whether the interruption condition of the catalyst activation treatment has been satisfied. The case in which cross leak occurs in the electrolyte membrane of the fuel cell 100 and the fuel gas (for example, hydrogen) leaks from the anode (fuel gas) electrode side to the cathode (oxidizing gas) electrode side is an example of the interruption condition of the catalyst activation treatment. The interruption condition determination means 104 can determine that the interruption condition has been satisfied when a pressure drop of the fuel gas on the anode electrode side is equal to or greater than the predetermined amount or when the predetermined concentration of the fuel gas can be directly detected on the cathode electrode side. The configuration of the interruption condition determination means 104 differs depending on the cross leak detection method. For example, the pressure drop of the fuel gas can be detected by a pressure sensor provided in the fuel gas supply system, or a computer can verify the pressure drop based on a parameter corresponding to the pressure variation in the fuel gas.

The oxidizing gas supply means 105 is a functional block that supplies the oxidizing gas (air) Air to the cathode electrode of the fuel cell 100. The entire device that can control the supplied amount of the oxidizing gas Air, or part of such device, for example, an air compressor, can be used as the oxidizing gas supply means 105.

In accordance with the present invention, when the interruption condition of the catalyst activation treatment is determined by the interruption condition determination means 104 to be satisfied in the course of the catalyst activation treatment, the control means 103 issues, to the voltage conversion means 101, a standby voltage, that is, a voltage that has to be maintained for the fuel cell operation, rather than a low voltage for the catalyst activation treatment, as a command value Cvfc. After issuing the command, the control means 103 waits till the oxidizing gas condition supply conditions is satisfied, and then controls the oxidizing gas supply means 105 so that the oxidizing gas Air is supplied to the cathode electrode side of the fuel cell 100.

With such configuration, when the catalyst activation treatment is interrupted, the output voltage Vfc of the fuel cell 100 is first returned to the standby voltage, while the amount of oxidizing gas in the catalyst activation treatment is relatively small. Therefore, the output power itself does not rise rapidly. Then, the supply of the oxidizing gas Air is first started after the system waits till the oxidizing gas supply condition is satisfied. The oxidizing gas supply condition is that a predetermined time elapses before the output voltage Vfc of the fuel cell 100 rises sufficiently (Embodiment 1), or that the predetermined voltage value is reached at which the output power Vfc of the fuel cell 100 is not increased rapidly even when the oxidizing gas Air is supplied (Embodiment 2). Therefore, in accordance with the present invention, the occurrence of extra power that cannot be consumed in the fuel cell 100 can be inhibited.

(Embodiment 1)

Embodiment 1 relates to an example of a method for controlling a fuel cell system in the case where the elapse of a predetermined time is taken as the oxidizing gas supply condition.

Figure 2:
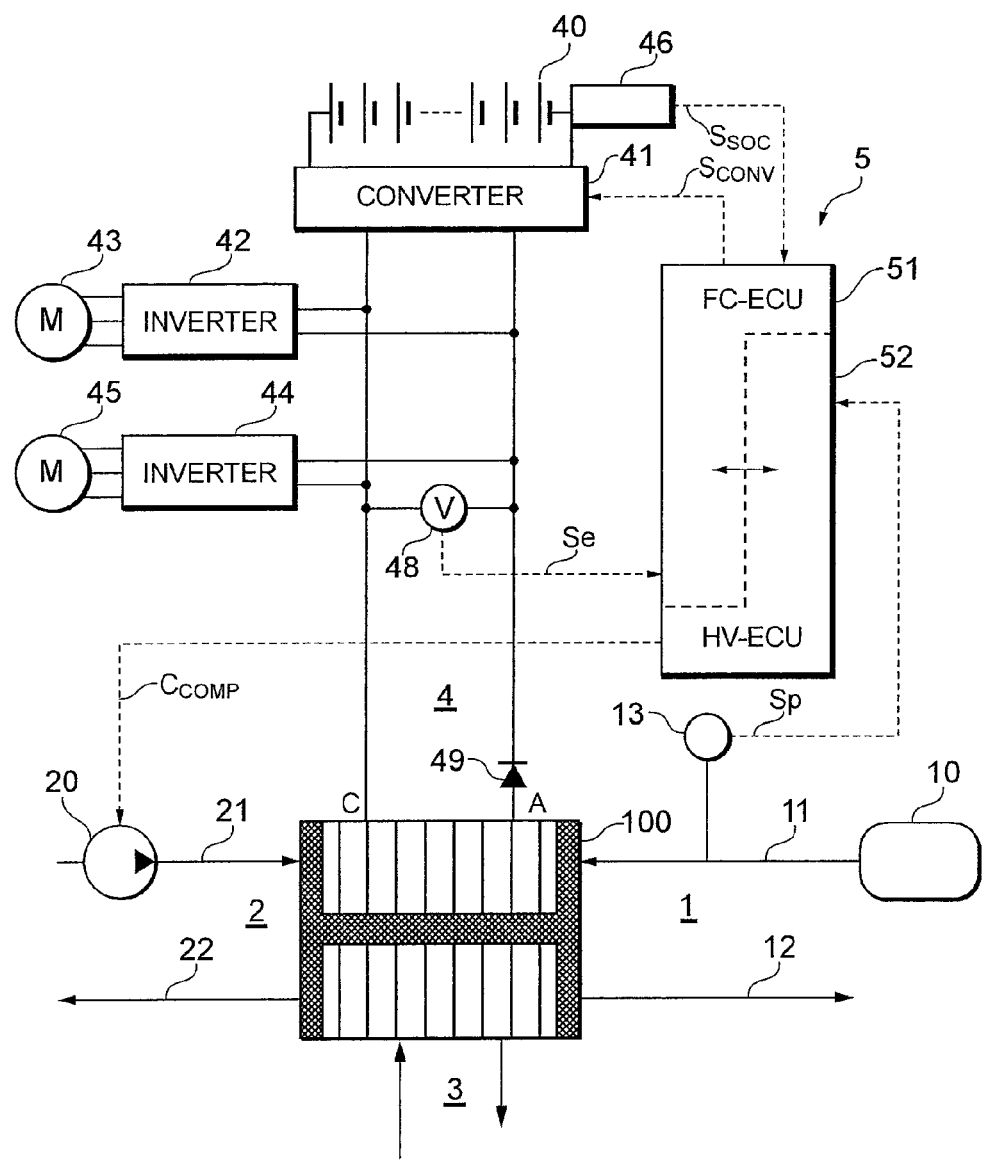
FIG. 2 is a structural drawing illustrating the entire configuration of the fuel cell system of an embodiment of the present invention.

FIG. 2 is a structural drawing illustrating the entire configuration of the fuel cell system of an embodiment of the present invention.

As shown in FIG. 2, the fuel cell system of Embodiment 1 is composed of a below-described anode gas supply system 1 that supplies hydrogen gas that is the anode gas to the fuel cell 100, a cathode gas supply system 2 that supplies the air that is the cathode gas to the fuel cell 100, a power system 4, and a control unit 5 (control means) that performs the necessary control of catalyst layer activation in accordance with the present invention.

The fuel cell 100 has a stack structure in which a plurality of cells (unit cells) are stacked. Each cell has a structure in which a power generating body called a MEA (Membrane Electrode Assembly) is sandwiched between a pair of separators having flow channels for the hydrogen gas, air, and cooling water. The MEA has a structure in which a polymer electrolyte membrane is sandwiched between two electrodes (anode electrode and cathode electrode). The anode electrode is configured by providing a catalyst layer for a fuel electrode on a porous support layer, and the cathode electrode is configured by providing a catalyst layer for an air electrode on a porous support layer. Other suitable forms of fuel cells include fuel cells of a phosphoric acid type and molten carbonate type. The catalyst layers of these electrodes are configured, for example, by attaching platinum particles, and the present invention relates to a catalyst activation treatment performed to remove oxides that have adhered to the platinum particles due to power generating operation of the fuel cell.

In the fuel cell 100, a reverse reaction of water electrolysis is induced, and hydrogen gas that is an anode gas is supplied from the fuel gas supply system 1 to the anode (negative electrode) electrode side. Air serving as a cathode gas containing oxygen is supplied from the cathode gas supply system 2 to the cathode (positive electrode) electrode side. A reaction such as represented by Formula (1) is induced at the anode electrode side, a reaction such as represented by Formula (2) is induced at the cathode electrode side, electrons are caused to circulate, and an electric current flows.

$$H_2 \rightarrow 2H^+ + 2e^- \tag{1}$$

$$2H^+ + 2e^- + (1/2)O_2 \rightarrow H_2O \tag{2}$$

The anode gas supply system 1 comprises a hydrogen tank 10 as a hydrogen gas supply source, an anode gas supply path 11, an anode off-gas discharge path 12, and a fuel gas pressure sensor 13 that detects the cross leak of the hydrogen gas by measuring the hydrogen gas pressure. In addition, the anode gas supply system may be provided with a hydrogen pump for pumping the hydrogen gas, a base valve, a regulation valve, a cut-off valve, and a check valve for managing and controlling the hydrogen gas, and a gas-liquid separator (not shown in the figures).

The hydrogen tank 10 is filled with the high-pressure hydrogen tank. In addition to the high-pressure hydrogen tank, a hydrogen tank using a hydrogen storage alloy, a hydrogen supply mechanism using a reform gas, a liquid hydrogen tank, or a liquid fuel tank can be also employed as the hydrogen supply source. The anode gas supply path 11 is a pipe for supplying the high-pressure hydrogen gas. A regulation valve (regulator) that is not shown in the figure may be provided in the intermediate section of the pipe. The hydrogen gas supplied from the anode gas supply path 11 is supplied into the fuel cell 100 via a manifold to the anode electrodes of each unit cell and, after causing an electrochemical reaction in the MEA anode, this gas is discharged as an anode off-gas (hydrogen off-gas). The anode off-gas discharge path 12 is a path for discharging the anode off-gas discharged from the fuel cell 100 and it may form a circulation path. In order to form the circulation path, the anode off-gas is returned again to the anode gas supply path 11 via a check valve or an ejector (not shown in the figure).

The cathode gas supply system 2 comprises a compressor 20, a cathode gas supply path 21, and a cathode off-gas discharge path 22. In addition, the cathode gas supply system may comprise a humidifier for controlling the humidity of air serving as the cathode gas, a gas-liquid separator that removes the cathode off-gas (air off-gas), a diluting unit for mixing the anode off-gas with the cathode off-gas, and a muffler (not shown in FIG. 2).

The compressor 20 relates to the oxidizing gas supply means in accordance with the present invention and serves to compress the air introduced from an air cleaner or the like, change the amount of air or air pressure, and supply the air to the cathode electrode side of the fuel cell 100. Similarly to the hydrogen gas, the air supplied from the cathode gas supply path 21 is supplied into the fuel cell 100 via a manifold to the cathode electrode side of each unit cell and, after inducing an electrochemical reaction in the MEA cathode, is discharged as the cathode off-gas. The cathode off-gas discharged from the fuel cell 100 is diluted with the anode off-gas and discharged.

The power system 4 comprises a battery 40, a DC-DC converter 41, a traction inverter 42, a traction motor 43, a auxiliary inverter 44, a high-voltage auxiliary apparatus 45, a battery computer 46, a current sensor 47, a voltage sensor 48 relating to the voltage detection means in accordance with the present invention that measures the output voltage of the fuel cell, and a diode 49 that prevents a counterflow.

The battery 40 is a rechargeable power storage device (secondary battery). Secondary batteries of various kinds such as nickel-hydrogen batteries can be used as the battery. A rechargeable power storage device, for example a capacitor, can be also used instead of the secondary battery. Where a plurality of battery units generating a constant voltage are stacked and connected in serial, the battery 40 can produce a high-voltage output. The battery computer 46 is provided at the output terminal of the battery 40 and can communicate with the control unit 3. The battery computer 46 monitors the charged state of the battery 40, maintains the battery within a an appropriately charged state in which the battery is neither overcharged nor overdischarged, and if a state is assumed in which the battery is charged or overdischarged, the battery computer notifies the control unit 3 to this effect.

The DC-DC converter 41 relates to the voltage conversion means in accordance with the present invention and has a configuration equivalent to that of the output conversion means in accordance with the present invention that increases or decreases the voltage between the primary side and the secondary side, thereby causing the transmission of power. For example, the output voltage of the battery 40 of the primary side is increased to the output voltage of the fuel cell 100 of the secondary side, and a power is supplied to a load device such as the traction motor 43 or high-voltage auxiliary apparatus 45. Conversely, the extra power of the fuel cell 100 on the secondary side or the recovered power from the load device is routed to be charged upon voltage reduction to the battery 40 of the primary side.

The traction inverter 42 converts the direct current into a three-phase alternating current and supplies it to the traction motor 43. The traction motor 43 is, for example, a three-phase motor that is the main power source of the automobile where the fuel cell system is mounted.

The auxiliary inverter 44 is a direct current-alternating current conversion means for driving the high-voltage auxiliary apparatus 45. The high-voltage auxiliary apparatus 45 can be a motor of a variety of types necessary for the operation of the fuel cell system, such as a motor for the compressor 20, hydrogen pump, and cooling system.

The control unit 5 is the control means in accordance with the present invention and comprises two control units. One control unit is a HV control unit 51 that performs control of a hybrid travel mode, and the other control unit is an FC control unit 52 that controls the operation of the fuel cell. The control units have a configuration of a typical computer comprising a CPU (central processing unit), a RAM, a ROM, an interface circuit, and the like, and control of the entire system is enabled by communication therebetween. The HV control unit 51 controls the electric system 4 by successively executing a software program stored in the internal ROM or the like, more particularly takes into account the power generated by the fuel cell 100, the charged power of the battery 40, and the consumed power of motors and controls the flow of power between these components. In addition, this control unit can execute part of the catalyst layer activation method in accordance with the present invention. Further, the fuel cell control unit 52 controls the entire fuel cell system mainly including the anode gas supply system 1 and cathode gas supply system 2 by successively executing a software program stored in the internal ROM or the like, and also can execute part of the catalyst layer activation method in accordance with the present invention.

Figure 3:
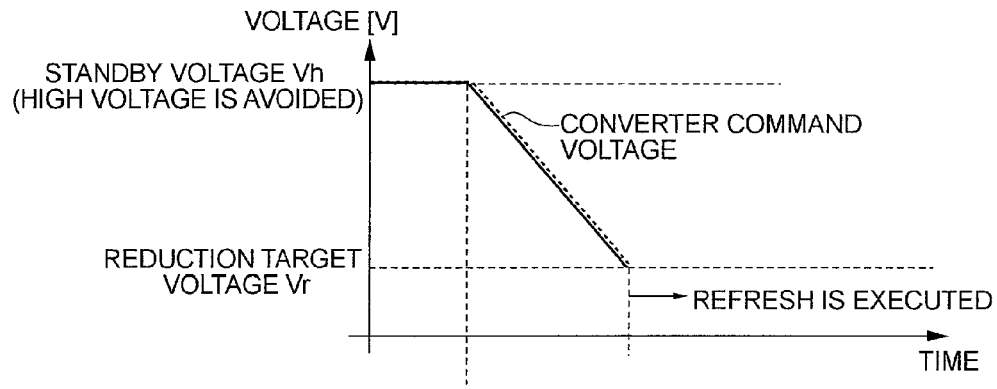
FIG. 3 is a chart illustrating the variation with time of the relationship between the output voltage of the fuel cell and the control operation of the catalyst layer regeneration treatment in the catalytic fuel cell system of Embodiment 1 of the present invention.

FIG. 3 is a chart illustrating the variation with time of the relationship between the output voltage of the fuel cell and the control operation of the catalyst layer regeneration treatment in the catalytic fuel cell system of Embodiment 1 of the present invention.

FIG. 3 illustrates the case in which the control operation of the catalyst layer regeneration treatment in the catalytic fuel cell system is executed as is, without satisfying conditions at which the activation treatment of the catalyst layer has to be interrupted.

The regeneration treatment of the catalyst layer (activation treatment of the catalyst layer) shown in FIG. 3 is usually performed on condition that a state is assumed in which the battery 40 that is a power storage device can be charged to a power equal to or higher than the predetermined power, and the control unit 5 determines whether this condition is satisfied and controls the subsequent activation treatment.

In the MEA of a fuel cell in the usual operation mode, hydrogen ions generated on the anode electrode side according to Formula (1) above permeate through the electrolyte membrane, move to the cathode electrode side and participate in electrochemical reaction represented by Formula (2) together with oxygen contained in the oxidizing gas (for example, air) supplied to the cathode electrode side, thereby causing a reduction reaction of oxygen. As a result, compositional components (for example, platinum) of the catalyst layer are covered with oxygen, the reaction resistance is increased, and power generation efficiency is degraded. The catalyst activation (regeneration) treatment is performed to remove oxygen contained in the catalyst by a reduction reaction. More specifically, as the terminal voltage of each unit cell, that is, the output voltage of the fuel cell is decreased, as shown in FIG. 3, the electrochemical reaction of the catalyst layer is caused to make a transition from the oxidation reaction region during usual operation into the reduction reaction region, and the catalyst is activated.

The secondary-side voltage of the converter can change according to the voltage command value issued to the converter, but because the converter is connected in parallel to the output terminals of the fuel cell, when the output voltage of the fuel cell does not reach the target secondary-side voltage that was set in the converter, the secondary-side voltage of the converter does not reach the target secondary-side voltage. On the other hand, when the output voltage of the fuel cell is higher than the target secondary-side voltage of the converter, the output voltage of the fuel cell is forcibly controlled to the target secondary-side voltage and the current value rises according to the I-V characteristic of the fuel cell. Thus, the secondary-side voltage of the converter determines the upper limit value of the output voltage of the fuel cell.

(Explanation of Operation)

The operations performed when the catalyst activation treatment is interrupted in the fuel cell system of Embodiment 1 will be described below.

As shown in FIG. 3, even in the case where the target secondary-side voltage that has been set in the converter is lower than the standby voltage and is a reduction target voltage, when the output voltage of the fuel cell 100 is lower than the standby voltage Vh, if the terminated supply of the oxidizing gas is restarted, the oxidizing gas is rapidly supplied and power generation returns to the state based on the usual I-V characteristic. Therefore, the output power of the fuel cell 100 sometimes rapidly rises and if the occurrence of such an effect is not prevented, the battery 40 is overcharged.

Accordingly in Embodiment 1, when the catalyst activation treatment is interrupted, the output voltage of the fuel cell 100 returns to the standby voltage Vh and then the terminated supply of the oxidizing gas is restarted with a delay, thereby preventing the effect of rapidly rising output voltage of the fuel cell 100. The operation of the control unit 5 in the catalyst activation treatment of the present embodiment will be explained below mainly with respect to the operations performed when the catalyst activation treatment is interrupted.

Figure 4:
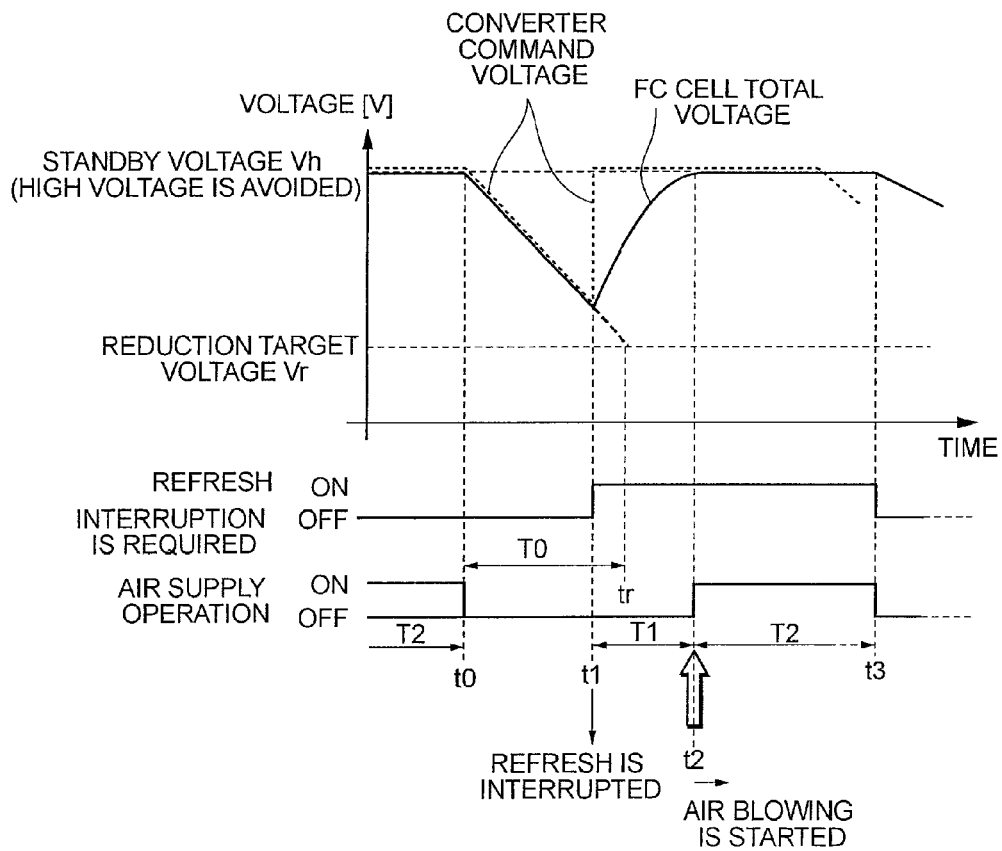
FIG. 4 is a chart illustrating the variation with time of the relationship between the output voltage of the fuel cell and the control operation of the catalyst layer regeneration treatment in the catalytic fuel cell system of Embodiment 1 of the present invention.
Figure 5:
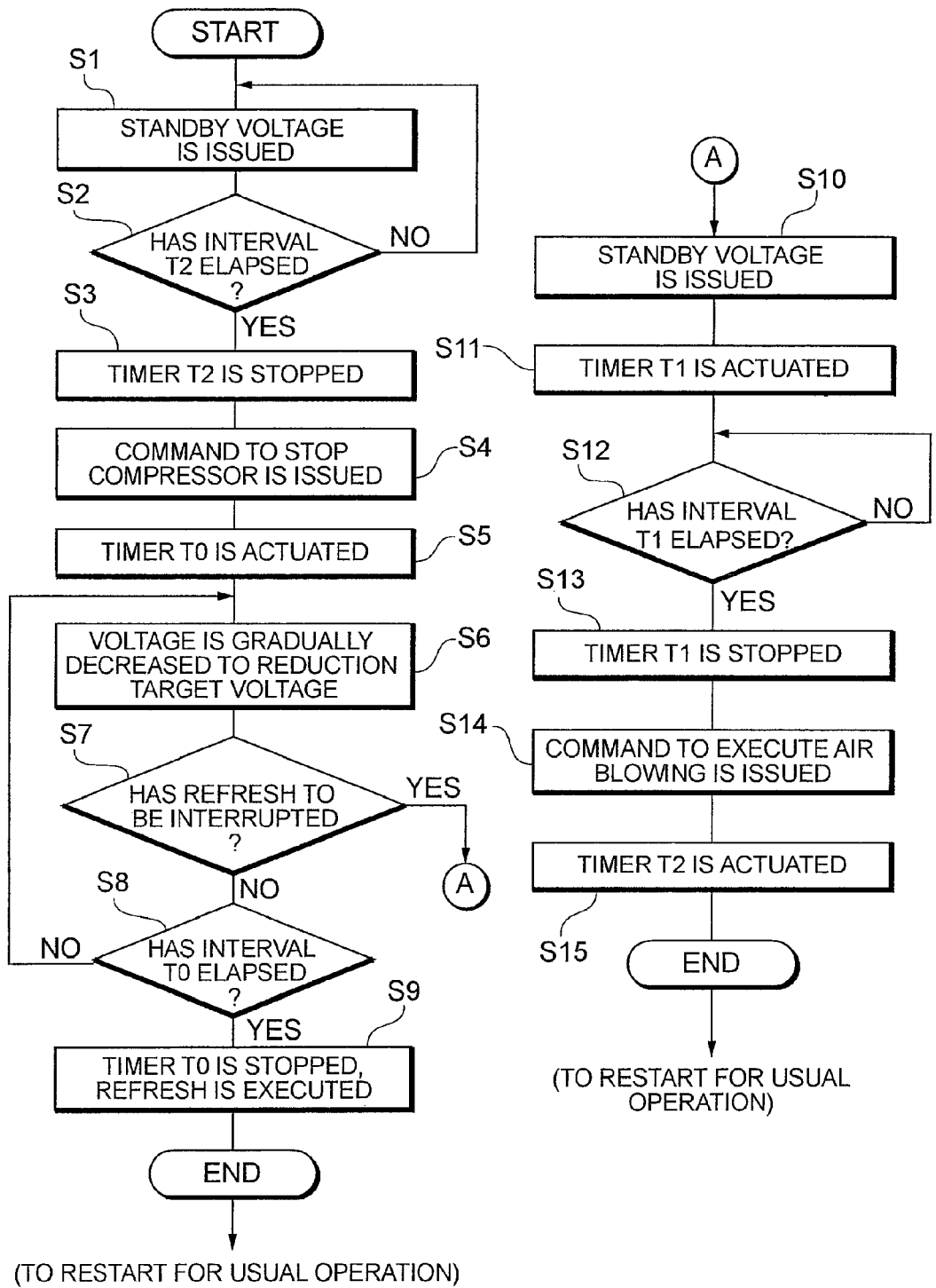
FIG. 5 is a flowchart illustrating the operation of the control unit 5 in the catalytic fuel cell system of Embodiment 1 of the present invention, this operation being focused on the catalyst layer regeneration treatment.

FIG. 4 is a chart illustrating the variation with time of the relationship between the output voltage of the fuel cell and the control operation of the catalyst layer regeneration treatment in the catalytic fuel cell system of Embodiment 1 of the present invention. FIG. 5 is a flowchart illustrating the operation of the control unit 5 in the catalytic fuel cell system of Embodiment 1 of the present invention, this operation being focused on the catalyst layer regeneration treatment.

The control operation of the catalyst layer regeneration treatment shown in FIG. 4 and FIG. 5 relates to the case in which the condition at which the catalyst layer activation treatment has to be interrupted has been satisfied in the course of operations and the treatment is interrupted.

Here, the catalyst activation treatment is assumed to be performed periodically, and in Embodiment 1, the catalyst activation treatment start timing and interruption timing are determined by the internal timer of the control unit 5. For example, a timer that starts operating at time t0 and counts a period T0 till the output voltage of the fuel cell 100 reaches the reduction target voltage within a time tr will be called below "timer T0". A timer that counts a standby interval from a point of time at which the conditions at which the catalyst activation treatment has to be interrupted is reached to the start of air supply is a timer T1, and a timer that counts an interval period T2 of the catalyst activation treatment is a timer T2.

As shown in FIG. 4 and FIG. 5, within the interval period of the catalyst activation treatment, that is, before the period T2 indicated by the timer T2 elapses (step S2: NO), the catalyst activation treatment is not performed, and the control unit 5 continues to maintain a command signal $C_{CONV}$ indicating the voltage command value to the converter 41 at the standby voltage Vh, which is a target voltage of the usual operation mode, so that usual operations are performed (step S1). As a result, the output voltage of the fuel cell 100 is maintained at the standby voltage Vh, and adequate power supply to the system is performed. Here, the standby voltage Vh can be also called a voltage that makes it possible to avoid high voltage, in the meaning of being an upper limit value that should not be reached or exceeded by the output voltage of the fuel cell 100 in order to increase endurance and the like.

Then, where the period T2 counted by the timer T2 reaches the time t0 in step S2 (YES), the control unit 5 stops the timer T2 in step S3 and, at the same time, the control unit 5 outputs to the compressor 20 a command signal $C_{COMP}$ that stops the operation of the compressor 20 that supplies an oxidizing gas (for example, air) outputted to the compressor 20 in step S4. As a result, the operation of the compressor 20 is stopped, and the active supply of the oxidizing gas via the oxidizing gas supply system 2 is stopped. At the same time, in step S5, the control unit 5 sets in the timer T0 a period T0 required for the output voltage of the fuel cell 100 to reach the reduction target voltage and starts the count with the timer T0. In step S6, the control unit linearly and gradually decreases the command signal $C_{CONV}$, which is a voltage command value issued to the converter 41, so as to match the predetermined response characteristic.

In the case of normal operation, as a result of the above-described treatment, the gradual decrease of the secondary-side voltage of the converter 41 is combined with the consumption of oxidizing gas and the output voltage of the fuel cell 100 decreases linearly, as shown in FIG. 4. Thus, as shown in FIG. 4, the output voltage (secondary-side voltage of the converter 41) of the fuel cell 100 decreases gradually and reaches the reduction target voltage Vr at the time tr in which the period T0 has elapsed since the time t0. This voltage is experimentally determined as a voltage at which the catalyst layer makes a complete transition from the oxidation reaction region to the reduction reaction region. In the case of normal operation, the refresh of the catalyst layer is advanced by maintaining the voltage at the level of this reduction target voltage Vr.

During such decrease of the output voltage of the fuel cell 100, the control unit 5 verifies whether the condition that requires the refresh to be interrupted has been satisfied (step S7). In the case the condition that requires the refresh to be interrupted has been satisfied (YES), the control unit moves to step S10, and in the case the condition that requires the refresh to be interrupted has not been satisfied (NO), the control unit advances to step S8.

The reception of a cross leak detection signal Sp from the fuel gas pressure sensor 13 that detects the cross leak of the fuel gas (hydrogen) is taken herein as one condition that requires the refresh to be interrupted.

Another condition that requires the refresh to be interrupted can be established by monitoring the operation of accelerator or the like.

Further, where a configuration is provided such that the fuel gas leak can be detected, for example, with a hydrogen concentration sensor, the detection of fuel gas leak with the concentration sensor can be set as a condition that requires the refresh to be interrupted.

In step S8, the control unit 5 verifies whether the count of timer T0 has reached the time (period T0) that elapses before the reduction target voltage Vr is reached, and where the count of timer T0 has not yet reached the time (period T0) that elapses before the reduction target voltage Vr is reached (NO), the control unit returns to step S6. Where the count of timer T0 has reached the time (period T0) that elapses before the reduction target voltage Vr is reached (YES), the control unit advances to step S9.

In step S9, the control unit 5 stops the timer T0, performs the control necessary for the activation treatment of the catalyst layer of the fuel cell 100 in the reduction region, and ends the treatment (as a result, the control unit enters the interval period T2).

The control necessary for the activation treatment of the catalyst layer of the fuel cell 100 in the reduction region can include, for example, the steps of fixing the output voltage of the fuel cell 100 to the reduction target voltage Vr by maintaining the voltage command value based on the command signal $C_{CONV}$ issued to the converter 41 at the reduction target voltage Vr, advancing the reduction reaction in the catalyst layer, and activating the catalyst layer, but this is not the specific treatment according to the present invention and, therefore, may be implemented by other well-known method. In the course of implementing the catalyst layer activation treatment, the generated electric current rises and the generated electric power also rises. Therefore, the excess power created by generation of power in the fuel cell 100 is outputted to the primary side of the battery 41 via the converter 41 and charged into the battery 40 by a hybrid operation.

When any of the above-described refresh interruption conditions is satisfied, in step S10, the control unit 5 takes the command signal $C_{CONV}$ indicating the voltage command value to the converter 41 as a standby voltage Vh, which is the target voltage of the normal operation mode.

Then, the control unit 5 sets the standby period T1 from the point of time at which the condition requiring the catalyst activation treatment to be interrupted is satisfied (that is, time t1) to the supply of air to the timer T1 and starts the count with the timer T1 (step S11).

Here, the standby period T1 set in the timer T1 can be found as an empirical value in accordance with the difference (that is, voltage drop from the standby voltage) between the standby voltage Vh and the output voltage of the fuel cell 100 at the point of time at which a condition requiring that the catalyst activation treatment be stopped is satisfied (that is, time t1). Within the standby period T1, the supply of the oxidizing gas to the fuel cell 100 is terminated, but the output voltage of the fuel cell 100 can be raised by the remaining air. Further, FIG. 4 illustrates the case in which the output voltage of the fuel cell 100 reaches the standby voltage Vh at the point of time t2, but in accordance with the present invention it is not generally necessary for the output voltage of the fuel cell 100 to reach the standby voltage Vh at the time t2 and it may be below the standby voltage Vh.

Then, the control unit 5 verifies whether the count of the timer T1 has reached the standby period T1 from the point of time at which the condition requiring the catalyst activation treatment to be interrupted is satisfied (that is, time t1) to the air supply, waits till the count of the timer T1 reaches the standby period T1 from the point of time at which the condition requiring the catalyst activation treatment to be interrupted is satisfied (that is, time t1) to the air supply, and advances to step S13 once the count of the timer T1 reaches the standby period T1 from the point of time at which the condition requiring the catalyst activation treatment to be interrupted is satisfied (that is, time t1) to the air supply (YES) (step S12).

In step S13, the control unit 5 stops the timer T1. Then, it advances to step S14 and issues a command to execute air blowing. Thus, the control unit 5 sends a command signal $C_{COMP}$ that restarts the operation of the compressor 20 to the compressor 20. As a result, a large amount of the oxidizing gas (for example, air) is supplied from the oxidizing gas system 2 to the cathode electrode of the fuel cell 100, and then the output voltage of the fuel cell 100 can be maintained within a range below the standby voltage Vh.

Here, the amount of oxidizing gas supplied to the cathode electrode of the fuel cell 100 is set to an amount such that the oxidizing gas can be supplied to all the cathode electrodes of the fuel cell 100.

In step S15, at the same time as the aforementioned air blowing execution command is issued, the timer T2 is started, this timer counting the interval period T2 till the next catalyst activation treatment, and the treatment is ended (as a result, the control unit enters the interval period T2).

(Merits of Embodiment 1)

Embodiment 1 has the following merits.

In Embodiment 1, even if a condition requiring the interruption of activation treatment is satisfied as the output voltage of the fuel cell 100 reaches the reduction target voltage, only the standby voltage Vh that determines the upper limit of the output voltage is immediately issued to the converter 41 and a stage of supplying the oxidizing gas is not reached. The time at which the air blowing execution command is issued, that is, the time at which the command signal $C_{COMP}$ that restarts the operation of the compressor 20 is sent to the compressor 20, comes after the output voltage of the fuel cell 100 rises close to the standby voltage Vh. Therefore, the occurrence of troubles such as a rapid increase in the output voltage of the fuel cell 100 caused by air blowing and overcharging of the battery 40 can be avoided.

Another effect attained with Embodiment 1 is that detecting the output voltage with a sensor is unnecessary.

(Embodiment 2)

In Embodiment 1, the control unit 5 detects the treatment timing by actuating a timer, but in Embodiment 2, the treatment timing is detected by detecting the actual output voltage of the fuel cell.

The system configuration in Embodiment 2 is identical to that of Embodiment 1 shown in FIG. 2.

Figure 6:
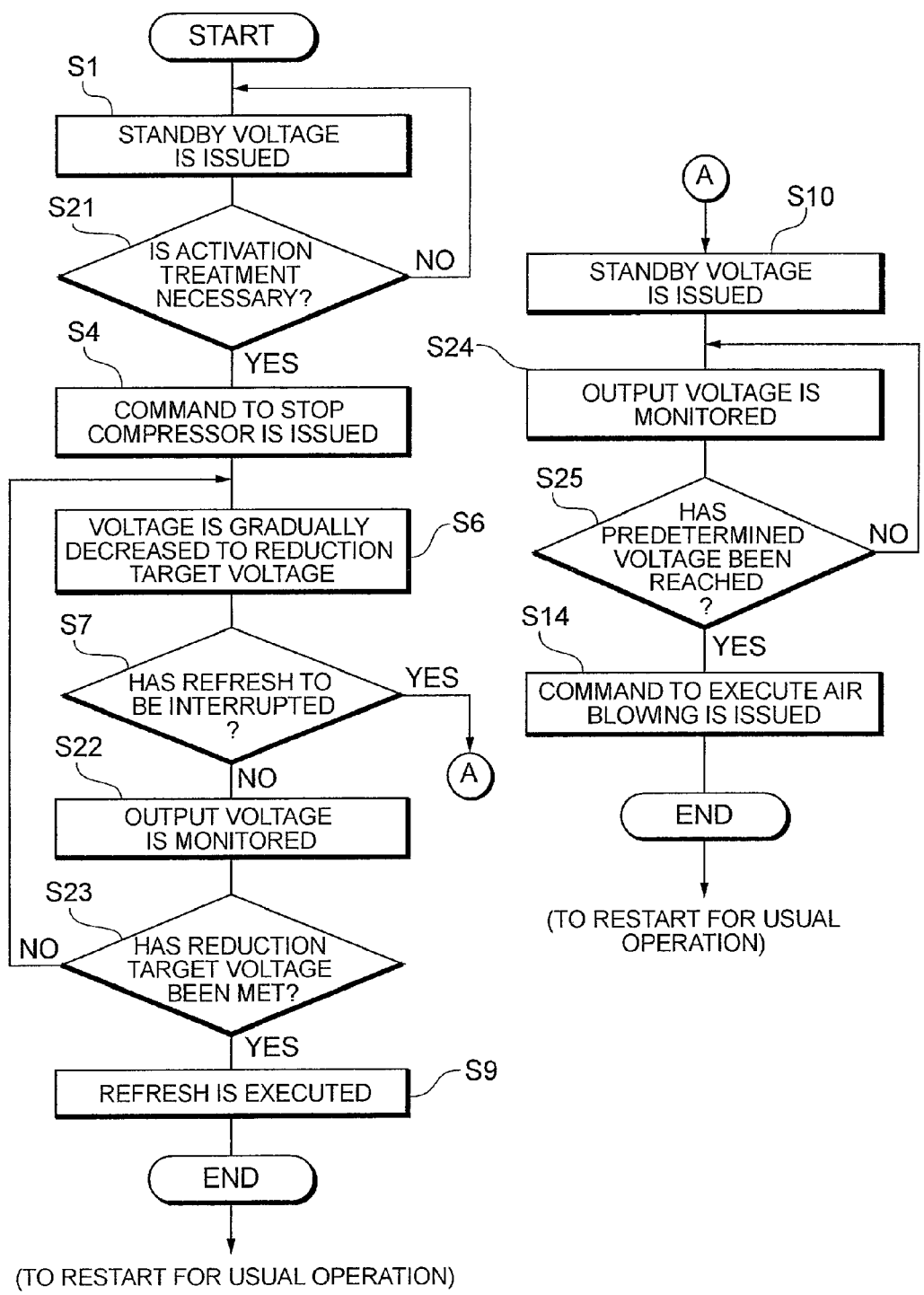
FIG. 6 is a flowchart illustrating the operation of the control unit 5 in the catalytic fuel cell system of Embodiment 2 of the present invention, this operation being focused on the catalyst layer regeneration treatment.

FIG. 6 is a flowchart illustrating the operation of the control unit 5 in the catalytic fuel cell system of Embodiment 2 of the present invention, this operation being focused on the catalyst layer regeneration treatment. As a preamble of operations in Embodiment 2, a control unit 5 is assumed to monitor periodically the output voltage (secondary-side voltage of a converter 41) of a fuel cell 100 that is detected by a voltage sensor 48. The processing identical to that of Embodiment 1 will be assigned below with identical step numbers.

As shown in FIG. 6, in step S1, the control unit 5 continues to maintain a command signal $C_{CONV}$ indicating the voltage command value to the converter 41 at the standby voltage Vh, which is a target voltage of the usual operation mode, so that usual operations are performed.

In step S21, the control unit 5 determines whether a state for performing the catalyst activation treatment has been assumed. Several approaches can be employed to determine whether the catalyst activation treatment has to be performed. For example, in Embodiment 1, the catalyst activation treatment is assumed to be performed periodically with a predetermined interval period T4. Therefore, the elapsed time of the internal timer T2 offers possibilities for performing the catalyst activation treatment.

However, performing the catalyst activation treatment periodically is not always necessary. This is because the amount of oxide formed by the catalyst varies depending on the conditions of use. For example, where a large amount of oxide is formed on the catalyst, the cell output drops. Thus, the output according to the I-V characteristic inherent to the fuel cell cannot be obtained. Accordingly, catalyst activation can be determined to be necessary if the amount of current that is actually taken out does not reach the amount of current estimated from the I-V characteristic although the output voltage of the fuel cell 100 has been set to a predetermined voltage.

It follows from above, that the control unit 5 can monitor the operation state of the fuel cell 100 or the power generation mode of the fuel cell based on any condition and determine that the catalyst activation treatment is necessary when a predetermined condition is met.

When the catalyst activation treatment is determined to be necessary (YES) in step S21, the control unit 5 moves to step S4. In step S4, a command signal $C_{COMP}$ that stops the drive of a compressor 20, which supplies the oxidizing gas (for example, air) that has been outputted to the compressor 20, is sent to the compressor 20. As a result, the drive of compressor 20 is stopped, and the active supply of the oxidizing gas via an oxidizing gas supply system 2 is stopped. Then, the control unit moves to step S6. In step S6, the control unit 5 linearly and gradually decreases the command signal $C_{CONV}$, which is the voltage command value to the converter 41, according to a predetermined response characteristic. As a result of the above-described treatment, the gradual decrease of the secondary-side voltage of the converter 41 is combined with the consumption of oxidizing gas and the output voltage of the fuel cell 100 decreases linearly, as shown in FIG. 4.

Here, in Embodiment 1, the waiting time from start to end of voltage decrease is measured with the timer T0, but in Embodiment 2, the output voltage of the fuel cell 100 is directly determined in step S22. When the system is in the standby operation mode, the output voltage of the fuel cell 100 has to reach the reduction target voltage Vr when the time tr in FIG. 4 is reached.

During such decrease of the output voltage of the fuel cell 100, the control unit 5 verifies whether the condition that requires the refresh to be interrupted has been satisfied (step S7). In the case the condition that requires the refresh to be interrupted has been satisfied (YES), the control unit moves to step S10, and in the case the condition that requires the refresh to be interrupted has not been satisfied (NO), the control unit advances to step S22.

The reception of a cross leak detection signal Sp from the fuel gas pressure sensor 13 that detects the cross leak of the fuel gas (hydrogen) is taken herein as one condition that requires the refresh to be interrupted.

Another condition that requires the refresh to be interrupted can be established by monitoring the operation of accelerator or the like.

Further, where a configuration is provided such that the fuel gas leak can be detected, for example, with a hydrogen concentration sensor, the detection of fuel gas leak with the concentration sensor can be set as a condition that requires the refresh to be interrupted.

In step S22, the control unit 5 monitors the output voltage of the fuel cell 100 by an output voltage detection signal Se of a voltage sensor 48. Then, in step S23, the control unit verifies whether the output voltage of the fuel cell 100 has reached the reduction target voltage. Where the output voltage of the fuel cell 100 has not reached the reduction target voltage (NO), the control unit returns to step S6, and where the output voltage of the fuel cell 100 has reached the reduction target voltage (YES), the control unit advances to step S9.

In step S9, the control unit 5 stops the timer T0, performs control necessary for the activation treatment of the catalyst layer of the fuel cell 100 in the reduction region, and ends the treatment (as a result, the control unit enters the interval period T2).

When any of the above-described refresh interruption conditions is satisfied, in step S10, the control unit 5 takes the command signal $C_{CONV}$ indicating the voltage command value to the converter 41 as a standby voltage Vh, which is the target voltage of the normal operation mode.

Then, in step S24, the control unit 5 monitors the output voltage of the fuel cell 100 by the output voltage detection signal Se of the voltage sensor 48. In the subsequent step S25, the control unit verifies whether the output voltage of the fuel cell 100 has reached the vicinity of the standby voltage. Where the output voltage of the fuel cell 100 has not reached the vicinity of the standby voltage (NO), the control unit returns to step S24, and where the output voltage of the fuel cell 100 has reached the vicinity of the standby voltage (YES), the control unit advances to step S14, and issues a command to execute air blowing. Thus, the control unit 5 sends a command signal $C_{COMP}$ that restarts the operation of the compressor 20 to the compressor 20 and ends the treatment (accordingly, the control unit enters the interval period T2). As a result, a large amount of the oxidizing gas (for example, air) is supplied from the oxidizing gas system 2 to the cathode electrode of the fuel cell 100, and then the output voltage of the fuel cell 100 can be maintained within a range below the standby voltage Vh.

Here, because the length of the interval in which the output voltage of the fuel cell is returned from the output voltage at the time the activation treatment interruption was started to the vicinity of the standby voltage changes in accordance with the amount of residual air, it would hardly be desirable to perform measurements by setting the timer 1 as in Embodiment 1. Therefore, in the present embodiment, the output voltage is directly detected by determining the variation of the residual amount of air, instead of measuring the time interval.

Further, the amount of oxidizing gas supplied to the cathode electrode of the fuel cell 100 is set to an amount such that the oxidizing gas can be supplied to all the cathode electrodes of the fuel cell 100.

Further, FIG. 4 illustrates the case in which the output voltage of the fuel cell 100 reaches the standby voltage Vh at the time t2, but in accordance with the present invention it is not generally necessary for the output voltage of the fuel cell 100 to reach the standby voltage Vh at the time t2 and it may be below the standby voltage Vh.

In the above-described Embodiment 2, in the course of catalyst activation treatment, the control unit 5 determines the timing for making a transition to the next treatment by detecting the actual output voltage of the fuel cell 100, rather than operating the timer. The variation of the output voltage of the fuel cell is affected by the actual amount of oxidizing gas remaining inside the fuel cell 100. Performing the treatment based on the output voltage of the fuel cell means that the treatment timing is determined in accordance with the actual residual amount of oxidizing gas inside the fuel cell. In other words, with Embodiment 2, the catalyst activation treatment (including the interruption thereof) can be advanced at an adequate timing corresponding to the amount of residual gas.

Further, it is also possible to combine the case in which the output voltage of the fuel cell 100 is detected as in Embodiment 2 with the case in which the treatment timing is detected by a timer as in Embodiment 1. In other words, at least one from among the timers T0 to T2 may be used in addition to detecting the output voltage of the fuel cell 100.

(Other Embodiments)

The present invention is not limited to the above-described embodiments and can be changed in a variety of ways.

For example, in the above-described embodiments, the supplied amount of the oxidizing gas is controlled by controlling the drive of the compressor 20 during catalyst layer regeneration treatment (including the interruption treatment thereof), but a configuration in which the supply of hydrogen from the hydrogen tank 10 is controlled in combination with this control may be also used. Further, the supplied amounts of the oxidizing gas and fuel gas may be also controlled by controlling the opening and closing of valves of the oxidizing gas supply system and fuel gas supply system.

The sequence of treatment steps in the above-described embodiments can be changed appropriately.

Further, the fuel cell system of the above-described embodiments is applicable to electric automobiles and other movable objects (movable on the ground, on the water, in the water, and in the air) and also to stationary systems.

In accordance with the present invention, when the supply of an oxidizing gas is restarted according to any condition in the course of a catalyst activation treatment, the supply of the oxidizing gas is restarted after waiting till the output voltage of the fuel cell rises above a predetermined voltage value. Therefore, it is possible to avoid the occurrence of rapid increase in the output voltage of the fuel cell and overcharging of the secondary battery caused by a sudden supply of the oxidizing gas in an output voltage restriction state in which the output current of the fuel cell became relatively large.

I claim:

1. A fuel cell system in which a catalyst activation treatment is implemented by stopping a supply of an oxidizing gas to a cathode electrode of a fuel cell and reducing an output voltage of the fuel cell, comprising:
a control unit which controls the output voltage of the fuel cell and the supply of the oxidizing gas to the cathode electrode of the fuel cell, wherein
the control unit is programmed to, when the catalyst activation treatment is interrupted in the course of implementing the catalyst activation treatment, return the output voltage of the fuel cell to a standby voltage by increasing the output voltage of the fuel cell, and
after waiting till an oxidizing gas supply condition is satisfied, resume the supply of the oxidizing gas to the cathode electrode of the fuel cell,
wherein the oxidizing gas supply condition is that the output voltage of the fuel cell approaches the standby voltage when returning the output voltage of the fuel cell to the standby voltage.

2. The fuel cell system according to claim 1, comprising:
a voltage converter which changes the output voltage of the fuel cell in accordance with a voltage command value; and
a cathode gas supply system which supply the oxidizing gas to a cathode electrode of the fuel cell, wherein
the control unit is further programmed to determine whether an interruption condition of the catalyst activation treatment has been satisfied, and
when the control unit determines that the interruption condition of the catalyst activation treatment has been satisfied in the course of implementing the catalyst activation treatment, the control unit issues the standby voltage as a command value to the voltage converter, waits thereafter till the oxidizing gas supply condition is satisfied, and then performs control of the cathode gas supply system to resume the supply of the oxidizing gas to the cathode electrode of the fuel cell.

3. The fuel cell system according to claim 2, wherein the interruption condition of the catalyst activation treatment is that a cross leak occurrence is detected in the fuel cell.

4. The fuel cell system according to claim 3, wherein the cross leak occurrence is detected by a predetermined decrease of a pressure of a fuel gas on the anode electrode side of the fuel cell.

5. The fuel cell system according to claim 2, wherein an amount of the oxidizing gas supplied to the fuel cell is an amount of the oxidizing gas sufficient to be supplied to the all cathode electrodes of the fuel cell.

6. The fuel cell system according to claim 1, wherein the oxidizing gas supply condition is that a predetermined time elapses from a point of time at which a treatment for returning the output voltage of the fuel cell to the standby voltage is implemented.

7. The fuel cell system according to claim 1, wherein the oxidizing gas supply condition is that the output voltage of the fuel cell reaches a predetermined voltage value.

8. The fuel cell according to claim 1, further comprising a power storage device, wherein the catalyst activation treatment is started on condition that the power storage device is in a state in which it can be charged to a power amount equal to or larger than a predetermined power amount.

9. A movable object comprising the fuel cell system according to claim 1.

10. A method for controlling a fuel cell system in which a catalyst activation treatment is implemented by stopping a supply of an oxidizing gas to a cathode electrode of a fuel cell and reducing an output voltage of the fuel cell, the method comprising the steps of:
determining whether the catalyst activation treatment is interrupted in the course of implementing the catalyst activation treatment;
returning the output voltage of the fuel cell to a standby voltage by increasing the output voltage of the fuel cell when the catalyst activation treatment is determined to be interrupted;
waiting till an oxidizing gas supply condition is satisfied; and
resuming the supply of the oxidizing gas to the cathode electrode of the fuel cell when the oxidizing gas supply condition is satisfied,
wherein the oxidizing gas supply condition is that the output voltage of the fuel cell approaches the standby voltage when returning the output voltage of the fuel cell to the standby voltage.

* * * * *

UNITED STATES PATENT AND TRADEMARK OFFICE
CERTIFICATE OF CORRECTION

PATENT NO.        : 8,465,878 B2
APPLICATION NO.   : 12/280062
DATED             : June 18, 2013
INVENTOR(S)       : Michio Yoshida Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1214 days.

Signed and Sealed this
Eighth Day of September, 2015

Michelle K. Lee
*Director of the United States Patent and Trademark Office*